United States Patent [11] 3,630,471

| [72] | Inventor | Charles G. Fredericks<br>Silver Spring, Md. |
|---|---|---|
| [21] | Appl. No. | 805,185 |
| [22] | Filed | Mar. 7, 1969 |
| [45] | Patented | Dec. 28, 1971 |
| [73] | Assignee | Occidental Aircraft Corporation<br>Washington, D.C. |

[54] NOSE SLAT FUSELAGE LIFTING BODY
8 Claims, 3 Drawing Figs.

[52] U.S. Cl. .................................................. 244/36
[51] Int. Cl. .................................................. B64c 1/00
[50] Field of Search ........................................ 244/13, 36, 41, 42, 43, 123, 42.4, 42.43, 42.45, 42.6

[56] References Cited
UNITED STATES PATENTS

| 2,685,420 | 8/1954 | Burnelli et al. ............... | 244/36 X |
| 1,427,012 | 8/1922 | Page ............................. | 244/42 |
| 1,818,000 | 8/1931 | Moles ........................... | 244/42 |
| 2,186,221 | 1/1940 | Weymouth ................... | 244/42 |
| 2,616,639 | 11/1952 | Burnelli ........................ | 244/36 |
| 2,650,045 | 8/1953 | Hunt ............................ | 244/42 X |

Primary Examiner—Milton Buchler
Assistant Examiner—C. A. Rutledge
Attorney—Littlepage, Quaintance, Wray and Aisenberg ABSTRACT: Combined airfoil lifting fuselage and airfoil wing short takeoff and landing aircraft have lift promoting nose slats spaced forward and above a leading edge of the fuselage.

Patented Dec. 28, 1971

3,630,471

INVENTOR
CHARLES G. FREDERICKS

BY James C. Wray
ATTORNEY

NOSE SLAT FUSELAGE LIFTING BODY

BACKGROUND OF THE INVENTION

The increased use of air for passenger and cargo transportation has developed an increased demand to use air transportation between closely spaced geographical locations. While actual flight time between the geographical locations may be so short as to result in an economic advantage in using air transportation, ground time to and from airports at the departure and destination locations reduces the time advantage of air transportation. Locating large airports within a city does not solve the problem since the conventional sized airports require far too much space to be located within a city. A trend has developed toward making very short runways close to a city, often along waterfront areas which may be close to city centers. Much development has been undertaken recently on short takeoff and landing aircraft which may use short runways. Due to high thrust requirements, propulsion systems of short takeoff and landing or STOL aircraft have employed propellers rather than jets. At the same time, airframe designs have tended to return to older airframe designs which previously have been deemphasized in favor of streamlined and swept wing designs. Although many prototype STOL aircraft have been tried, most of the prototypes are simply reworked models of earlier aircraft which have been phased out of use by large airlines.

SUMMARY OF THE INVENTION

The present invention is a form of short takeoff and landing aircraft which employs a lifting fuselage having an airfoil cross section which in turn supports laterally extended airfoil wings. Passengers or cargo are carried within the airfoil fuselage, and engines and control and command stations are supported forwardly on the fuselage. An empennage, including horizontal and vertical stabilizers, rudders and elevators, is connected rearwardly to the fuselage. The aircraft is provided with balloon flaps on the leading edges of the wings and with lift providing flaps at the trailing edges of the wings. The fuselage is provided with a trailing edge flap which can be extended rearwardly and downwardly upon landing and takeoff and a body flap which can be extended downwardly adjacent a mid point of the body upon landing and takeoff. All control surfaces, including the ailerons on the wings, the elevators and the rudders, are provided with trim tabs as is conventional in aircraft. Access to the fuselage for passengers and crew is provided by a lateral door beneath and to the rear of the wings. An entire rear section of the fuselage is removable, and the entire plane may be raised and lowered to provide easy access for cargo carriers. The overall length of a preferred embodiment of the aircraft is 86 feet, 3 inches. The airfoil fuselage has a chord length of 45 feet, and the empennage extends rearwardly 22 feet and 10 inches from a trailing edge of the airfoil fuselage. The overall height of the airplane at its tail is 29 feet. The tail assembly is 15 feet, 8 inches above the ground. The airplane may be raised and lowered 3 feet to adjust the cargo hatch for truck level loading. Access doors are 8 feet by 6 feet. Wings have a 1,280 square feet lifting area. The body has a 1,488 square feet lifting area. The horizontal tail is 440 square feet and the vertical tail is 250 square feet.

Two engines provide 10,000 HP with a shaft HP of approximately 9,900. The empty weight of the plane is 31,500 pounds, disposable weight is 44,200 pounds and gross weight is about 76,000 pounds. With a fuel capacity of 1,730 gallons, the aircraft is capable of carrying a payload of 33,000 pounds for 5 and ½ hours. The aircraft has a maximum velocity of 320 knots, a cruise velocity of 290 knots, and a stall velocity of 60 knots with full gross weight. Fully loaded, the aircraft has a range of 2,100 nautical miles. The aircraft can carry 4,300 ton miles per hour at a cost of 182 per hour, or 4 per ton mile. A passenger seating capacity of 100 is provided.

In order to provide increased load-carrying capacity for the aircraft under short takeoff and landing conditions, this invention provides nose slats near the leading edge of a lifting fuselage. The nose slats are preferably positioned with leading edges thereof slightly forward and above the leading edge of the lifting fuselage. Effectively, the nose slat increases air velocity across the upper surface of the fuselage thereby increasing the lift of the aircraft. The nose slats are extended from the fuselage during takeoff and landings. The nose slats may be permanently mounted in a forward operational position since drag added thereby is not substantial. Preferably, the nose slats are retractable rearwardly toward the fuselage so that a convex forward surface of the nose slats forms a portion of the convex forward surface of the fuselage. Alternatively, the nose slats may be withdrawn so that a concave rearward portion of the nose slat overlies a complimentary convex forward slope of the fuselage. As a further alternative, the nose slats are withdrawn rearwardly into the fuselage, and streamline covers are provided over the opening in the forward surface of the fuselage which receives the nose slats.

In a preferred modification of the invention, a fuselage has an airfoil cross section with a 30 foot chord. The vertical dimension at the thickest portion of the fuselage is 7 feet. A nose slat is positioned forwardly and above the leading edge of the fuselage. In the preferred modification, the nose slat has a convex upper surface and a concave lower surface extending over a chord length of 38 inches. The leading edge of the nose slat is positioned 11 inches forward and 7 and ½ inches above the leading edge of the fuselage. The trailing edge of the nose slat is spaced 4 inches from the closest surface of the fuselage. Generally, the nose slat should be positioned about one-third of a chord length above the fuselage leading edge and about one-fifth of the slat chord length above the leading edge of the fuselage.

One objective of this invention is the provision of a short takeoff and landing aircraft having increased cargo carrying capacity with respect to aircraft of similar design.

Another objective of this invention is the provision of a fuselage nose slat for lifting body aircraft.

This invention has an another objective the provision of nose slats for lifting body aircraft which slats are positioned forward and above a leading edge of a lifting body.

These and other objectives will be apparent from the disclosure which includes the specification, claims and drawings.

DETAILED DESCRIPTION OF THE DRAWINGS

Figure 1:
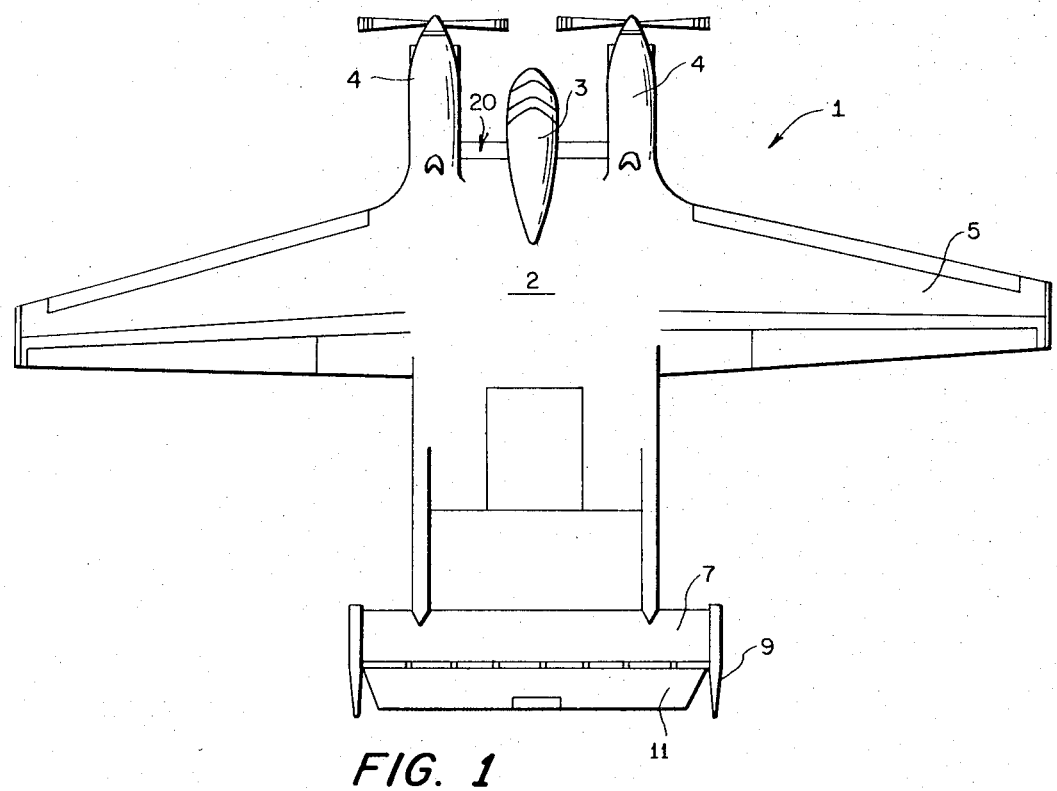
FIG. 1 is a plan view of a combined lifting fuselage and winged aircraft showing the positioning of lift-enhancing fuselage nose slats.

Referring to FIG. 1, a combined lifting fuselage and winged aircraft is generally referred to by numeral 1. A lifting fuselage 2 is the entire center portion of the aircraft. A control area 3 extends forwardly from a central portion of lifting fuselage 2, and engines 4 extend forwardly from fuselage 2 at opposite lateral edges of the fuselage. Wings 5 of a truncated triangular planform extend laterally from the fuselage. An empennage is mounted rearwardly on the fuselage by extending two streamlined support members rearwardly and upwardly from rear corners of the fuselage. A horizontal tail surface 7 is connected to the distal ends of the support members, and vertical tail surfaces 9 are connected at opposite lateral extremities of the tail surface 7. The tail assembly is provided with rudders in the vertical members 9 and elevators 11, which are attached to the horizontal member 7. Wings are provided with flaps, ailerons and trim tabs as is conventional in aircraft.

Figure 2:
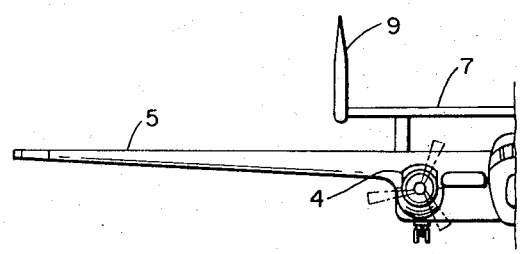
FIG. 2 is a one-half front elevation of an aircraft showing the positioning of the nose slats with respect to the engines and forward control area.
Figure 3:
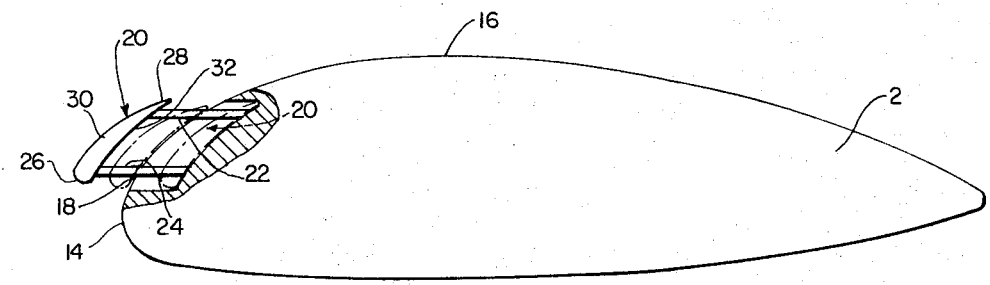
FIG. 3 is a detail of the positioning of a nose slat with respect to the lifting fuselage.

Referring to FIG. 3, it is seen that a nose slat 20 is connected to fuselage 2 adjacent a forward portion thereof by struts 22 and 24. Struts 22 and 24 may be constructed as extensible hydraulic assemblies for the extending and withdrawing of nose slat 20 into forward operational position and rearward stored position. As is shown in FIG. 3, leading edge 26 of nose slat 20 is positioned forward and above leading edge 14 of fuselage 2. As best seen in FIG. 1 and 2, nose slats 20 are mounted between engines 4 and cockpit control area 3 on the leading edge of the lifting fuselage 2. As shown in FIG. 3, the nose slat may be withdrawn rearwardly toward fuselage 2 so that the concave lower and rear surface 32 of the nose slat lies upon a forward portion of the upper curved surface 16 of fuselage 2. In an alternative embodiment, nose slat 20 may be withdrawn into the aircraft so that the forward and upper curved surface 30 of the nose slat tends to complete the upper curved surface 16 of fuselage 2. In a third embodiment, shown in phantom lines, nose slat 20 may be drawn entirely into fuselage 2, and fairings 18 maybe hydraulically slid into place to cover the nose slat access way in completion of the streamline form of fuselage 2.

While the invention has been particularly shown and described with reference to a preferred embodiment thereof, it will be understood by those skilled in the art that various changes in form and details may be made therein without departing from the spirit and scope of the invention.

What is claimed is:

1. Combined lifting body and wing short takeoff and landing aircraft apparatus comprising: a lifting fuselage, airfoil section wing members laterally connected to the fuselage and extending oppositely outward therefrom, empennage means connected to the fuselage and extending rearward therefrom, movable control surfaces mounted on the wing and on the empennage for controlling airflow thereon, and lift-enhancing nose slat means consisting of slat means mounted on the lifting body fuselage adjacent a leading edge thereof.

2. Combined lifting body and wing short takeoff and landing aircraft apparatus of claim 1, further comprising more than one propulsion means laterally spaced from each other and mounted on the fuselage and extended forward therefrom beyond a leading edge thereof, and wherein the nose slat means is mounted on the fuselage between the propulsion means.

3. Combined lifting body and wing short takeoff and landing aircraft apparatus of claim 2 further comprising cockpit means connected to the fuselage and extended forward therefrom beyond a leading edge thereof, and wherein the nose slat means is mounted on the fuselage between propulsion means and the cockpit means.

4. Combined lifting body and wing short takeoff and landing aircraft apparatus of claim 1 further comprising cockpit means mounted on the fuselage and extended forward therefrom beyond a leading edge thereof, and wherein the nose slat means mounted on the fuselage extend laterally outward from the cockpit means.

5. Combined lifting body and wing short takeoff and landing aircraft apparatus of claim 1 wherein the nose slat means comprises airfoil means spaced forward from an upward slope of the fuselage, a leading portion of the slat means being spaced forward and upward from a leading edge of the fuselage.

6. Combined lifting body and wing short takeoff and landing aircraft apparatus of claim 1, wherein the nose slat means extends across an entire leading edge of the fuselage.

7. Combined lifting body and wing short takeoff and landing aircraft apparatus of claim 1, wherein the nose slat means is movable rearwardly into streamline overlying arrangement with an upper slope of the fuselage.

8. Combined lifting body and wing short takeoff and landing aircraft apparatus of claim 1, wherein a leading edge of the nose slat is spaced forwardly of a leading edge of the fuselage by about one-third of a chord length of the nose slat and wherein the leading edge of the nose slat is spaced upwardly from the leading edge of the fuselage by about one fifth of a chord length of the nose slat.

* * * * *